(12) United States Patent
Kalwitz (10) Patent No.: US 12,260,093 B2
(45) Date of Patent: Mar. 25, 2025

(54) SYSTEMS AND METHODS FOR ELIMINATING GARBAGE COLLECTION IN SOLID-STATE DRIVES (SSDS)

(71) Applicant: SK Hynix NAND Product Solutions Corp., San Jose, CA (US)

(72) Inventor: George Kalwitz, Mead, CO (US)

(73) Assignee: SK Hynix Nand Product Solutions Corp., San Jose, CA (US)

(*) Notice: Subject to any disclaimer, the term of this patent is extended or adjusted under 35 U.S.C. 154(b) by 70 days.

(21) Appl. No.: 18/089,994

(22) Filed: Dec. 28, 2022

(65) Prior Publication Data

US 2024/0220128 A1  Jul. 4, 2024

(51) Int. Cl.
*G06F 3/06* (2006.01)

(52) U.S. Cl.
CPC ............ *G06F 3/0616* (2013.01); *G06F 3/064* (2013.01); *G06F 3/0659* (2013.01); *G06F 3/0679* (2013.01); *G06F 3/0689* (2013.01)

(58) Field of Classification Search
CPC ...... G06F 3/0616; G06F 3/064; G06F 3/0659; G06F 3/0679; G06F 3/0689
See application file for complete search history.

(56) References Cited

U.S. PATENT DOCUMENTS

| | | | | |
|---|---|---|---|---|
| 5,742,752 A | * | 4/1998 | DeKoning | .......... G06F 11/1076 |
| | | | | 714/E11.034 |
| 2015/0378886 A1 | | 12/2015 | Nemazie et al. | |
| 2016/0357776 A1 | | 12/2016 | Sundaram et al. | |
| 2018/0307596 A1 | * | 10/2018 | Pandurangan | ........ G06F 3/0652 |
| 2019/0391752 A1 | * | 12/2019 | Pletka | .................... G06F 3/0616 |
| 2021/0089217 A1 | * | 3/2021 | Björling et al. | ...... G06F 3/0616 |
| 2021/0200458 A1 | | 7/2021 | Dalmatov | |
| 2022/0327050 A1 | * | 10/2022 | Kanno | ................ G06F 12/0246 |

FOREIGN PATENT DOCUMENTS

WO     2014/105705 A2     7/2014

* cited by examiner

*Primary Examiner* — Francisco A Grullon
(74) *Attorney, Agent, or Firm* — HALEY GUILIANO LLP (57) ABSTRACT

Systems and methods for eliminating garbage collection in solid-state drives (SSDs) of a data center are disclosed herein. A data placement block (DPB) size is determined. An SSD receives, from a host device, a write command specifying a virtual logical block address (LBA). The SSD identifies a DPB based on the virtual LBA of the write command. The SSD causes data associated with the write command to be written to an erasable unit of memory of the SSD based on the identified DPB, and causes an association between the erasable unit of memory of the SSD and the virtual LBA of the write command to be stored.

18 Claims, 5 Drawing Sheets

SYSTEMS AND METHODS FOR ELIMINATING GARBAGE COLLECTION IN SOLID-STATE DRIVES (SSDS)

TECHNICAL FIELD

The present disclosure is related to systems and methods for eliminating garbage collection in SSDs, and, more particularly, to systems and methods for eliminating garbage collection in SSDs of a data center.

SUMMARY

In accordance with the present disclosure, systems and methods for eliminating garbage collection in SSDs of a data center are provided. The method includes determining a data placement block (DPB) size, receiving a write command specifying a virtual logical block address (LBA), identifying a DPB based on the virtual LBA of the write command, causing data associated with the write command to be written to an erasable unit of memory of the SSD based on the identified DPB, and causing to be stored an association between the erasable unit of memory of the SSD and the virtual LBA of the write command.

In some embodiments, identifying the DPB may include virtualizing capacity of the SSD as a linear array of DPBs, each being of the DPB size, where each DPB of the linear array of DPBs may be associated with a plurality of sequential virtual LBAs.

In some embodiments, a first DPB of the linear array of DPBs may be aligned on LBA zero.

In some embodiments, the method may include determining whether the identified DPB is a new DPB or an open DPB, and in response to determining that the identified DPB is a new DPB, opening the DPB may include allocating an internal band of media of the SSD for the new DPB, where the allocated internal band of media may include the erasable unit of memory of the SSD.

In some embodiments, storing an association between the allocated internal band of media and the DPB may include storing an association between LBAs of the allocated internal band of media to virtual LBAs of the DPB.

In some embodiments, allocating the internal band of media of the SSD to the new DPB may include allocating one or more erasable units of NAND media within the SSD to the new DPB, and allocating an additional erasable unit of NAND media within the SSD for defect management of the new DPB when XOR is enabled.

In some embodiments, allocating the internal band of media of the SSD to the new DPB may include allocating one or more erasable units of NAND media within the SSD to the new DPB.

In some embodiments, each of the one or more erasable units may be an erase block.

In some embodiments, the DPB size may be 1 gigabyte and a size of the erase block may be 64 megabytes, where allocating one or more erasable units of NAND media within the SSD to the new DPB may include allocating 16 erase blocks to the new DPB.

In some embodiments, the write command may be a nonvolatile memory express (NVMe) write command.

In some embodiments, an SSD is provided. The SSD includes SSD memory, and an SSD controller. The SSD controller may be configured to determine a DPB size, receive a write command specifying a virtual LBA, identify a DPB based on the virtual LBA of the write command, cause data associated with the write command to be written to an erasable unit of memory of the SSD memory based on the identified DPB, and cause to be stored an association between the erasable unit of memory of the SSD memory and the virtual LBA of the write command.

In some embodiments, the SSD controller may be configured to identify the DPB by virtualizing capacity of the SSD memory as a linear array of DPBs, each being of the DPB size, where each DPB of the linear array of DPBs may be associated with a plurality of sequential virtual LBAs, and where a first DPB of the linear array of DPBs may be aligned on LBA zero.

In some embodiments, the SSD controller may be further configured to determine whether the identified DPB is a new DPB or an open DPB, and in response to determining that the identified DPB is a new DPB, open the DPB by allocating an internal band of media of the SSD memory for the new DPB, where the allocated internal band of media may include the erasable unit of memory of the SSD memory.

In some embodiments, the SSD controller may be further configured to store an association between LBAs of the allocated internal band of media to virtual LBAs of the DPB.

In some embodiments, the SSD controller may be configured to allocate the internal band of media of the SSD memory to the new DPB by allocating one or more erasable units of NAND media within the SSD memory to the new DPB.

In some embodiments, each of the one or more erasable units may be an erase block, and the SSD controller may be configured to allocate one or more erasable units of NAND media within the SSD to the new DPB by allocating multiple erase blocks to the new DPB.

In some embodiments, a method of sending data to an SSD is provided. The method includes sending, to the SSD, a DPB size, virtualizing capacity of the SSD as a linear array of DPBs aligned on DPB-sized virtual LBA boundaries, where each one of the linear array of DPBs contains sequential virtual LBAs. The method further includes shaping data into a DPB; and sending, to the SSD, the shaped data via a plurality of write commands specifying virtual LBAs of the DPB.

In some embodiments, shaping data into the DPB may include shaping data in accordance with a redundant array of independent disk (RAID) format.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

Solid state drives (SSDs) are being increasingly used by data centers to store data. However, current approaches require SSD garbage collection, which causes write-amplification, requires over-provisioning and over-subscribing of media/back-end bandwidth, decreasing the performance and endurance of the SSDs while increasing cost and complexity to a data center. Accordingly, attempts have been made to reduce or eliminate garbage collection.

In some approaches, modern data storage centers may shape large regions of data to be written to an SSD. However, due to SSD characteristics and existing protocols coupling a host to each of the SSDs, data shaping alone may not reduce or eliminate garage collection as the SSDs may not be aware of the write-shaping by the host. For example, the host may be coupled to each of the SSDs through one or more busses using NVMe over Peripheral Component Interconnect Express (PCIe), and the SSDs may individually process write commands as they are received. Some other approaches are directed to changing existing host systems (e.g., the host-side software stack), SSDs, or existing communication protocols. However, such changes may be difficult to implement in existing data centers, SSDs, or existing communication protocols.

Accordingly, it would be advantageous to eliminate garbage collections without requiring any significant changes in the host-side software stack, the SSDs, or the communication protocol between a host and the SSDs.

In accordance with the present disclosure, a DPB mode for eliminating garbage collection in SSDs without requiring any significant changes in the host-side software stack, the SSDs, or the communication protocol between a host and the SSDs, is provided.

The subject matter of this disclosure may be better understood by reference to FIGS. 1-5.

Figure 1:
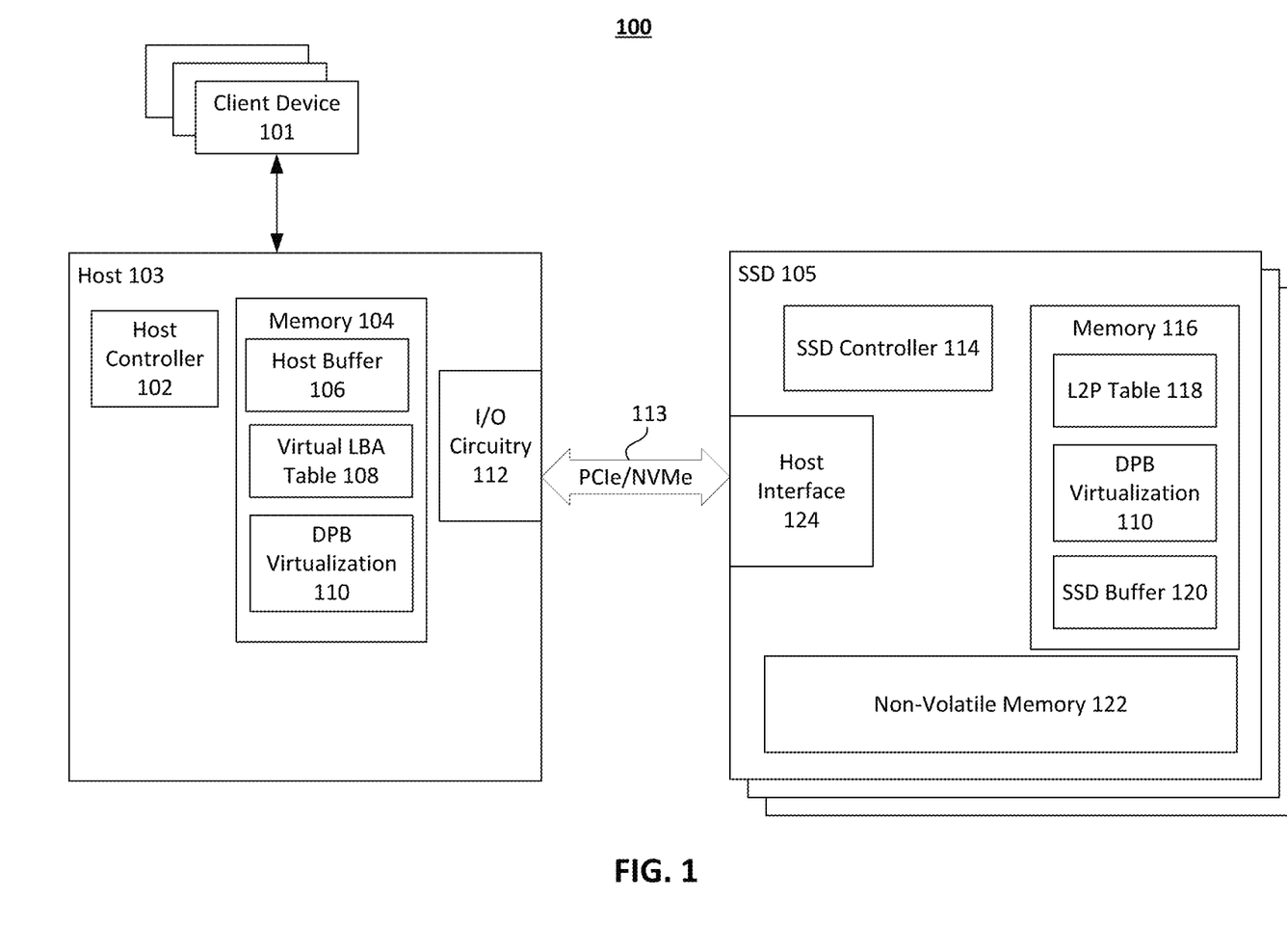
FIG. 1 shows an illustrative diagram of a storage system including a host device and an SSD that functions as a storage device for the host device, in accordance with some embodiments of the present disclosure.

FIG. 1 shows an illustrative diagram of storage system 100 including a host device 103 and an SSD 105 that functions as a storage device for the host device 103, in accordance with some embodiments of the present disclosure. It should be understood that the SSD 105 may be one of a plurality of SSDs in the storage system 100 (e.g., a data center). In some embodiments, a plurality of SSDs 105 may be configured as a RAID array. As shown, the host device 103 is coupled to the SSD 105 through one or more busses 113 using NVMe over PCIe. Revision 1.0c of NVM Express NVMe over PCIe Transport Specification dated Oct. 3, 2022 is incorporated by reference in its entirety. However, it should be understood that a variety of other protocols including serial attached small computer system interface (SAS) and serial advanced technology attachment (SATA) may be used.

The host device 103 includes a host controller 102, a memory 104, and input/output (I/O) circuitry 112. The host controller 102 may include one or more central processing units (CPUs), or other configurable controller such as programmable logic arrays (PLAs), field-programmable gate arrays (FPGAs), complex programmable logic devices (CPLDs), etc. The memory 104 may include random access memory (RAM), read only memory (ROM), programmable ROM (PROM), firmware, flash memory, etc., The I/O circuitry 112 may include a PCIe adapter that is communicatively coupled using NVMe over PCIe protocol over bus 113 to a host interface 124 of the SSD 105. In some embodiments, the I/O circuitry 112 may also include adapters that are communicatively coupled with one or more client devices 101, and the host device 103 may cause information received from one or more client devices 101 to be stored in SSD 105. As shown, the memory 104 may include a host buffer 106, a virtual LBA table 108, and a DPB virtualization 110, as described in further detail below. Additionally, in some embodiments, as specified by the NVMe protocol, the memory 104 may also implement other buffers such as a submission queue (SQ) and a completion queue (CQ) for submitting and completing NVME commands (e.g., write commands, read commands, etc.).

The SSD 105 includes an SSD controller 114, a memory 116, a non-volatile memory (NVM) 122, and the host interface 124. In some embodiments, the SSD 105 may be configured as an NVMe PCIe SSD. The memory 116 may include a logical-to-physical (L2P) table 118, the DPB virtualization 110, and an SSD buffer 120. Additionally, in some embodiments, as specified by the NVMe protocol, the memory 104 may also implement other buffers such as doorbell register (DR). The NVM 122 may include one or more packages of NVM dies. Each of the NVM dies may include a plurality of memory cells (e.g., NAND memory cells), which can each store one or more bits of information. As understood by those skilled in the art, memory cells may be organized into pages, and pages may be organized into blocks (e.g., an erasable unit). For an SSD comprising NAND memory cells, the L2P table 118 comprises a table to convert logical addresses, such as LBAs or virtual LBAs, to NAND physical block addresses (PBAs). The SSD buffer 120 may temporarily store information to be written to NVM 122. As explained in further detail below, each of the host device 103 and the SSD 105 may be configured to implement a DPB mode to perform the functions described above and below. For example, the host controller 102 and the SSD controller 114 may be configured to execute instructions stored in memory (e.g., a DPB application) to implement the DPB mode.

As referred to herein, the DPB mode refers to a virtualization that is implemented by the host device 103 and the SSD 105 such that the SSD 105 may dynamically adjust the size of an erasable unit of media within the NVM 122 of the SSD 105 (e.g., NAND media) to match the size of the shaped write region of the host device 103, and the flow of write data to the SSD 105 may be managed as a unit. For example, the DPB mode may use LBA (and virtual LBA) tracking algorithms to associate the shaped write region of the host device 103 with an erasable unit of media (e.g., a band) within the SSD 105. For clarity, the term "virtual LBAs" is used to describe the mapping to LBAs in the DPB mode. In some embodiments, by matching the size of the shaped write region of the host device 103 to match an erasable unit of the SSD 105 and managing the flow of write data to associate them as a unit, garbage collection may be eliminated.

In some embodiments, because the DPB mode is a virtualization, the DPB mode may be implemented in existing storage systems without requiring any significant changes in the host-side software stack (e.g., of the host device 103), the SSDs (e.g., the SSD 105), or the communication protocol between the host and the SSDs (e.g., NVMe over PCIe). In some embodiments, the DPB mode is a DPB application that is implemented in software or firmware executed by each of the host controller 102 and the SSD controller 114. In some embodiments, the DPB application can be accelerated or offloaded to application-specific integrated circuit (ASIC) gates or field-programmable gate array (FPGA) gates of the host controller 102 and the SSD controller 114.

In some embodiments, to operate in the DPB mode, certain operating parameters of the DPB mode must be shared or negotiated in advance between the host device 103 and the SSD 105. In some embodiments, the shared or negotiated operating parameters may include an SSD DPB-sized increment, an SSD DPB sector size, and a DPB size. In some embodiments, the shared or negotiated operating parameters further include an indication of whether the DPB mode is enabled (e.g., to provide backward compatibility with a legacy mode), an indication whether XOR is enabled, and the number of concurrently active DPBs. In some embodiments, other operating parameters to optimize DPB processing, such as bandwidth and response time expectations for processing and completing a DPB may also be negotiated between the host device 103 and the SSD 105.

In some embodiments, the shared or negotiated operating parameters may be shared or negotiated via an identify controller structure (e.g., by Get/Set Features commands), which may be implemented by the host controller 102. In some embodiments, other suitable commands or functions can be used. In some embodiments, one or more of the operating parameters may be set in advance (e.g., a fixed-function embodiment). In this case, sharing, configuring and/or negotiating preset operating parameters between the host device 103 and the SSD 105 are not required.

The DPB mode specifies certain virtualization conditions to enable the host device 103 and the SSD 105 to implement the DPB mode. For example, the DPB mode specifies that DPBs are aligned on DPB-sized LBA boundaries and that each DPB contains sequential LBAs (e.g., virtual LBAs). That is, the DPB mode virtualizes the storage capacity of an SSD (e.g., the storage capacity of the NVM 122) as a linear array of DPBs beginning at LBA 0 (e.g., the first DPB ("DPB 1") is aligned on LBA 0). The DPB mode may also specify certain other virtualization conditions, including a condition that the first command delivered to the SSD starts with the first LBA of the DPB (e.g., LBA 0 for DPB 1), a condition that the DPB is "owned" by the SSD until all NVMe commands associated with the open DPB completed and returned to the host device, and a condition to close an open DPB (e.g., when the DPB is full). In some embodiments, an explicit method to close a DPB may be negotiated between the host device and the SSD. In some embodiments, the conditions and operating parameters of the DPB mode may be stored in advance by the DPB virtualization 110, by both the host device 103 and the SSD 105.

Figure 2:
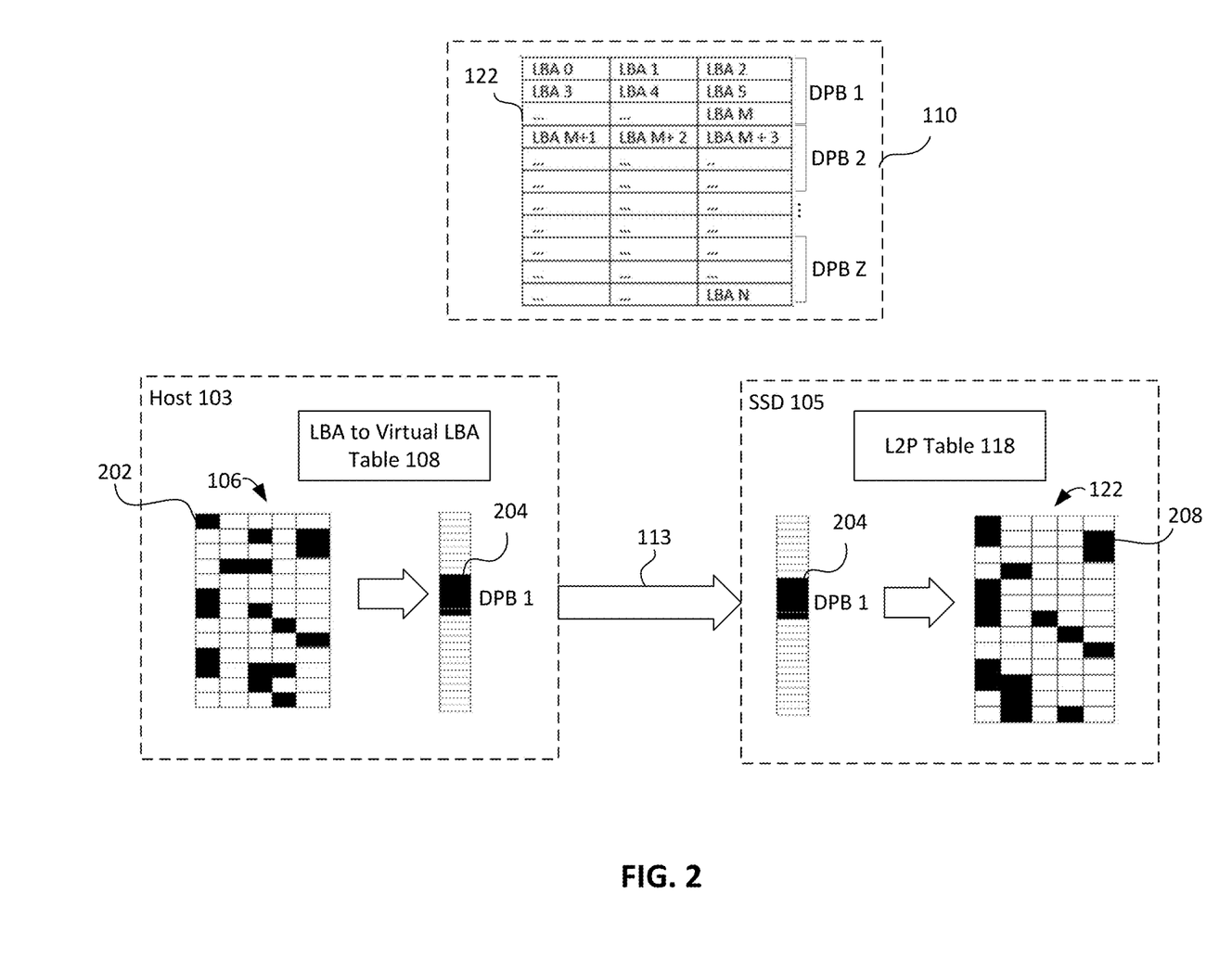
FIG. 2 illustrates a DPB mode implemented by the storage system of FIG. 1, in accordance with some embodiments of the present disclosure.

FIG. 2 illustrates an exemplary DPB mode implemented by the storage system 100 of FIG. 1, in accordance with some embodiments of the present disclosure. As shown, the DPB virtualization 110 virtualizes the storage capacity of the NVM 122 as a linear array of DPBs (DPB 1, DPB 2, . . . DPB Z) beginning at LBA 0, based on the negotiated (or fixed) operating parameters of the DPB mode. For example, if the DPB size is 1 GB and the SSD DPB sector size is 4096 bytes (e.g., 4 k sector), the DPB virtualization 110 virtualizes the storage capacity of NVM 112 as a linear array of 1 GB DPBs (each having 262, 144 sequential LBAs).

As shown in FIG. 2, the host controller 102 may shape data 202 stored in the host buffer 106 into a DPB-sized block (e.g., a 1 GB block). In some embodiments, the data 202 may be received from one or more clients 101 and stored in the host buffer 106. For example, the host controller 102 may map the physical memory to virtual file storage by mapping data 202 to virtual LBAs of the DPB (e.g., "DPB 1" 204) and store this mapping in virtual LBA table 108. For purposes of explanation, the data 202 is shown as dark blocks within the representation of the host buffer 106. In some embodiments, if the host controller 102 shapes data into a RAID block, the shaped block may include parity information. The host device 103 then sends, to the SSD 105, the shaped data via a plurality of write commands specifying the virtual LBAs of the DPB. For example, the host device 103 may communicate a plurality of write commands to the SSD 105 over one or more buses 113, as explained in greater detail below.

In response to receiving each of the plurality of write commands, the SSD controller 114 identifies a corresponding DPB (e.g., DPB 1 204) based on the virtual LBA ranges of the DPBs (e.g., based on the DPB virtualization 110). If the identified DPB 1 is already open, the SSD controller 114 writes the data 202 to an internal band of media 208 allocated to the identified DPB 1 and stores an association between the physical write location and the virtual LBA of the corresponding write command (e.g., by updating L2P table 118). For purposes of explanation, the data 202 written to the internal band of media 208 allocated to the identified DPB 1 is shown as dark blocks within the representation of the NVM 122. If the DPB 1 is new, the SSD controller 114 allocates an internal band of media to the new DPB 1 before writing the data 202 to the allocated internal band of media 208, as described in greater detail with reference to FIG. 5. Otherwise, if the DPB 1 is closed, the SSD controller 114 may recycle (i.e. deallocate and erase) the internal band of media 208 allocated to the identified DPB 1 and allocate a new internal band of media for the data to be written to.

Figure 3:
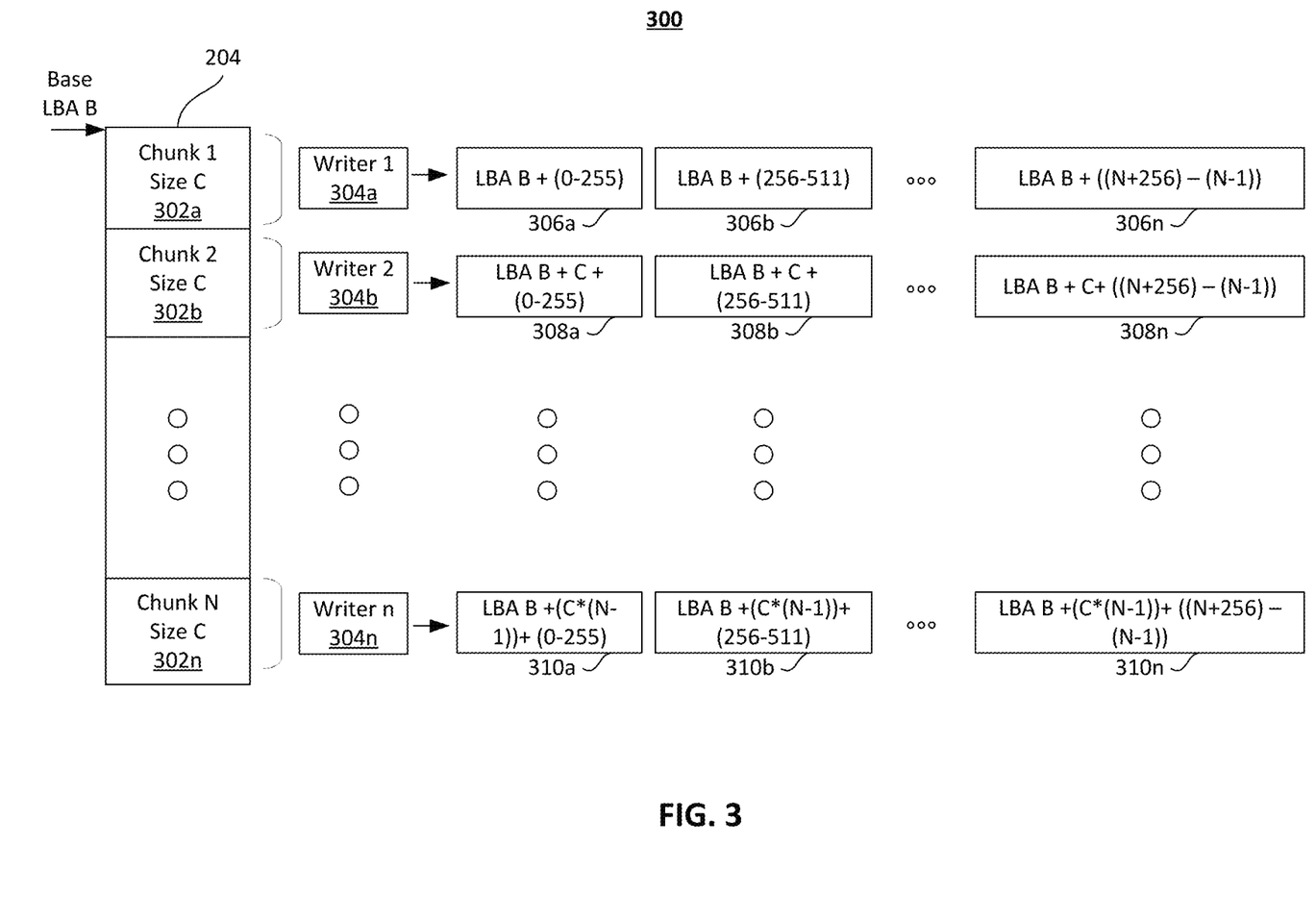
FIG. 3 shows an illustrative block diagram for writing a DPB to an SSD by a plurality of parallel NVMe write commands, in accordance with some embodiments of the present disclosure.

FIG. 3 shows an illustrative block diagram 300 for writing a DPB to an SSD (e.g., the SSD 105) by a plurality of parallel NVMe write commands, in accordance with some embodiments of the present disclosure. In some embodiments, because the DPB mode does not require write commands to be written sequentially, a DPB (e.g., the DPB 1 204) may be sent in parallel by a plurality of writers (writer 1 304a, writer 2 304b, . . . writer n 304n). For example, writer 1 304a may send a first chunk 302a of the DPB 204 as a plurality of NVMe write commands 306a, 306b . . . 306n; writer 2 304b may send a second chunk 302b of the DPB 204 as a plurality of NVMe write commands 308a, 308b . . . 308n; and writer n 304n may send an n chunk 302n of the DPB 204 as a plurality of NVMe write commands 310a, 310b . . . 310n. However, this is only one example, and the DPB 204 may be sent to the SSD 105 in any suitable manner. In some embodiments, each of the plurality of write commands (304, 306, and 308) may have a maximum data transfer size (MDTS) of 128 KB.

Figure 4:
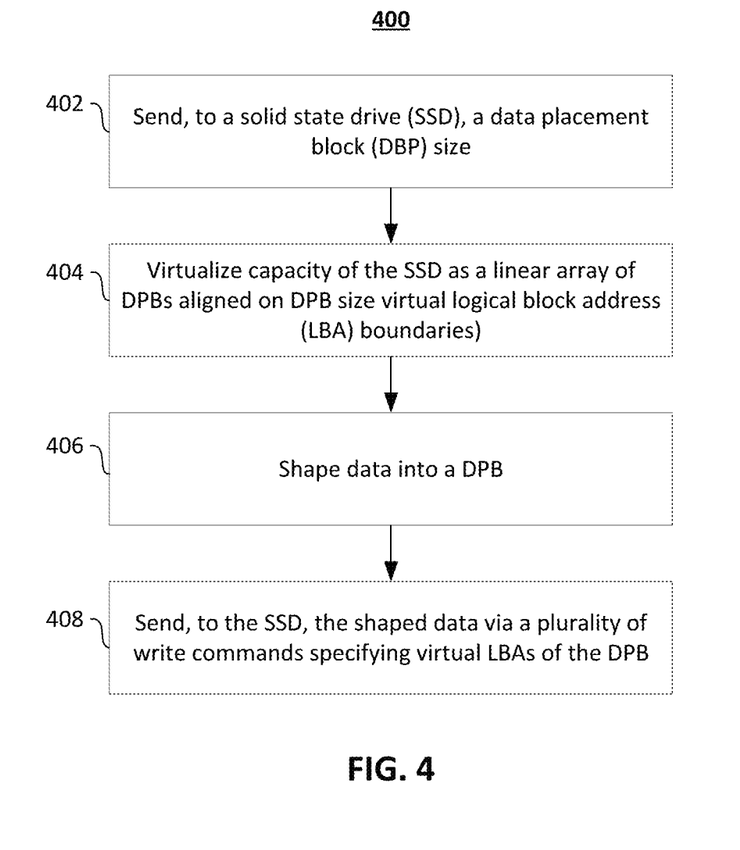
FIG. 4 shows a flowchart illustrating a process for implementing a DPB mode on the host device, in accordance with some embodiments of the present disclosure.

FIG. 4 shows a flowchart illustrating a process 400 for implementing a DPB mode on a host device (e.g., the host device 103), in accordance with some embodiments of the present disclosure. In some embodiments, the process 400 can be modified by, for example, having steps rearranged, changed, added, and/or removed.

At step 402, a host controller (e.g., the host controller 102) sends, to an SSD (e.g., the SSD 105), a DPB size, which may correspond to the size of the host device's shaped write region (e.g., 1 GB). In some embodiments, when the SSD is configured as an NVMe SSD, the Get/Set features structure may communicate the DPB size to the SSD. In some embodiments, operating parameters of the DPB mode may be set in advance. In this case, no operating parameters of the DPB mode need to be shared, configured, or negotiated between the host device and the SSD, and step 402 may be omitted.

At step 404, the host controller may virtualize the capacity of the SSD as a linear array of DPBs of the DPB size, aligned on DPB-sized virtual LBA boundaries. For example, if the capacity of the SSD is 1 TB, and the DPB size is 1 GB, the host controller may virtualize the capacity of the SSD as a linear array of 1000 DPB (e.g., DPB 1-DPB 1000), with the first DPB aligned at LBA 0.

At step 406, the host controller shapes data into a DPB. For example, the host controller 102 shapes data from one or more clients (e.g., client devices 101) into the DPB by mapping the data to virtual LBAs of the DPB. The host controller may store mapping in a table (e.g., the virtual LBA table 108). In some embodiments, the host controller shapes the data into one of a plurality of RAID blocks including parity data. In some embodiments, if XOR is enabled in the SSD, the SSD may also allocate DPB capacity to implement XOR internally across the media band.

At step 408, the host controller sends, to the SSD, the shaped data via a plurality of write commands specifying virtual LBAs of the DPB. For example, the host controller writes the plurality of commands into the submission queue (SQ) and notifies the SSD 105 by writing to the doorbell register (DR). In some embodiments, the size of the data transfer for each write command is 128kM-1 MB. In some embodiments, because the plurality of write commands do not need to be sent in sequential order, each of a plurality of writers of the host controller may send a different chunk of the DPB in parallel via a plurality of write commands (e.g., as shown in FIG. 3).

Figure 5:
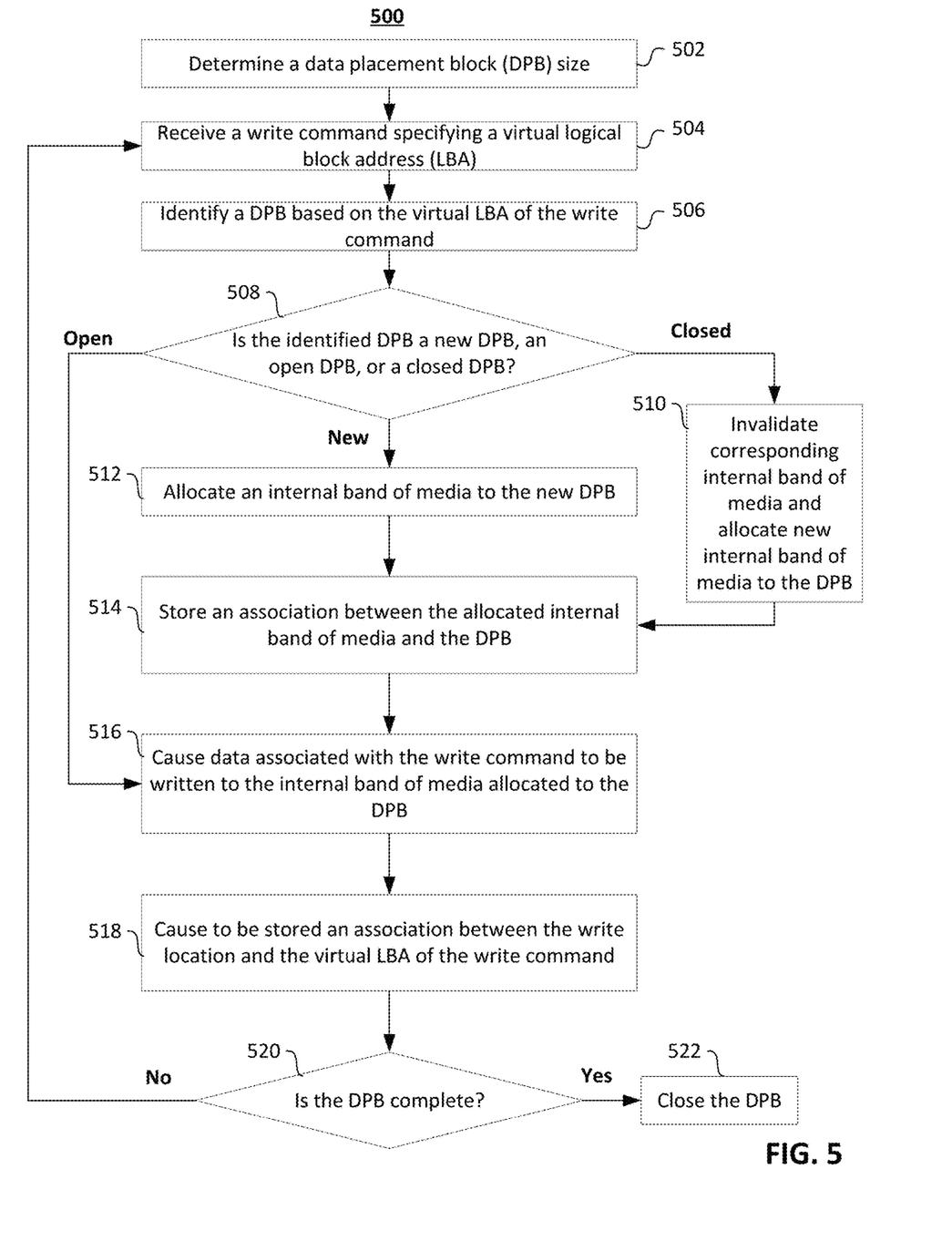
FIG. 5 shows a flowchart illustrating a process for implementing a DPB mode on the SSD, in accordance with some embodiments of the present disclosure.

FIG. 5 shows a flowchart illustrating a process 500 for implementing a DPB mode on an SSD (e.g., SSD 105), in accordance with some embodiments of the present disclosure. In some embodiments, the process 500 can be modified by, for example, having steps rearranged, changed, added, and/or removed.

At step 502, an SSD controller (e.g., the SSD controller 114) determines a DPB size (e.g., 1 GB). For example, the SSD controller 114 may receive the DPB size from a host device (e.g., host device 103). In some embodiments, operating parameters of the DPB mode may be set in advance. In this case, no operating parameters of the DPB mode need to be shared, configured, or negotiated between the host device and the SSD, and step 502 may be omitted.

At step 504, the SSD may receive a write command specifying a virtual LBA. For example, the SSD controller may retrieve the write command from an SQ of the host device, in response to receiving a notification in a DR.

At step 506, the SSD controller may identify a DPB based on the virtual LBA of the write command. For example, the SSD controller may match the virtual LBA to the DPB virtualization (e.g., the DPB virtualization 110) based on the range of virtual LBAs included in the DPB. For example, if the virtual LBA of the write command is LBA 0, the SSD controller may identify DPB 1, which comprises virtual LBA 0-LBA 262, 143 (e.g., based on a 4 k sector size).

At step 508, the SSD controller may determine if the identified DPB is a new DPB, an open DPB, or a closed DPB. In response to determining that the identified DPB is a new DPB ("New" at 508), processing proceeds to 512. In response to determining that the identified DPB is an open DPB ("Open" at step 508), processing proceeds to step 516. Otherwise, in response to determining that the identified DPB is a closed DPB ("Closed" at 508), processing proceeds to step 510.

At step 510, in response to determining that the identified DPB is a closed DPB ("Closed" at 508), the SSD controller invalidates the internal band of NVM corresponding to the closed DPB (e.g., based on a previously stored association between the internal band of media and the closed DPB). For example, the SSD controller deallocates the media band associated with the DPB to delete each of the erase blocks comprising the closed DPB. The SSD controller further allocates a new internal band of media to the identified DPB, as similarly described below in step 512. Processing then proceeds to step 514. In some embodiments, the host device may send a deallocate command to the SSD controller to delete a closed DPB. In this case, the host device will not send a write command to a closed DPB and step 510 may be omitted.

At step 512, in response to determining that the identified DPB is a new DPB ("New" at step 508), the SSD controller allocates an internal band of media to the new DPB. For example, the SSD controller allocates one or more erasable units of NVM (e.g., the NVM 122) to the new DPB. The SSD controller may allocate the one or more erasable units of the NVM to the new DPB based on any suitable allocation method employed by the SSD (e.g., for even wear, etc.). In some embodiments, each of the one or more erasable units of the NVM may be an erase block of NAND media. As shown in FIG. 2, the one or more erasable units of the NVM may not be sequential erasable units within the NVM. However, this is only an example, and the one or more erasable units may be sequential erasable units within the NVM. For example, if the DPB size is 1 GB and the erasable unit is 64 MB, the SSD control may allocate any 16 erasable units (e.g., 16 erase blocks) to the new DPB. In some embodiments, if the size of the erasable unit is fixed and not a factor of the size of the DPB, the excess capacity of the SSD allocated to an erase block (e.g., approximately 20 MB in the above example), may be used by the SSD (e.g., for defect management when XOR is enabled, for media management, moving read reference (MRR) table, data rewrites, etc.).

At step 514, the SSD controller stores an association between the allocated internal band of media and the DPB. For example, the SSD controller stores the identity of the one or more erasable units of memory allocated to the DPB in association with the DPB (e.g., comprising a range of virtual LBAs).

At step 516, the SSD causes data associated with the write command to be written to the internal band of media allocated to the DPB. For example, the SSD writes the data to a physical location of the internal band of allocated media.

At step 518, the SSD causes to be stored an association between the physical write location and the virtual LBA of the write command. For example, for an SSD comprising NAND memory cells, the SSD may update an L2P table (e.g., L2P table 118) to store an association between the virtual LBA of the write command and the NAND physical block address (PBAs) of the data specified by the write command.

At step 520, the SSD controller determines if the DPB is complete. For example, the SSD controller determines if there is any additional data to be written to the DPB (e.g., assigned virtual LBAs). In some embodiments, the SSD will determine that the DPB is complete when the DPB is full (e.g., an implicit close). For example, if the DPB is a RAID block (e.g., having a predetermined size), the SSD will close the DPB by an implicit close. In some embodiments, the SSD controller may receive an explicit close command from the host device. In response to determining that the DPB is not complete (e.g., "No" at step 520), processing returns to step 504. Otherwise ("Yes" at step 520), processing proceeds to step 522

At step 522, the SSD controller closes the DPB. In some embodiments, the number of DPBs that may be open simultaneously is limited.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method of managing data storage in a solid state drive (SSD), the method comprising:
    determining a data placement block (DPB) size;
    receiving a write command specifying a virtual logical block address (LBA);
    identifying a DPB based on the virtual LBA of the write command;
    determining whether the identified DPB is a new DPB or an open DPB;
    in response to determining that the identified DPB is a new DPB, opening the DPB by allocating an internal band of media of the SSD for the new DPB by:
        allocating one or more erasable units of memory of the SSD to the new DPB; and
        allocating an additional erasable unit of memory of the SSD for defect management of the new DPB when XOR is enabled,
    wherein the allocated internal band of media comprises the one or more erasable units of memory of the SSD;
    causing data associated with the write command to be written to the one or more erasable units of memory of the SSD; and
    causing to be stored an association between the one or more erasable units of memory of the SSD and the virtual LBA of the write command.

2. The method of claim 1, wherein identifying the DPB comprises virtualizing capacity of the SSD as a linear array of DPBs, each being of the DPB size, wherein each DPB of the linear array of DPBs is associated with a plurality of sequential virtual LBAs.

3. The method of claim 2, wherein a first DPB of the linear array of DPBs is aligned on LBA zero.

4. The method of claim 2, further comprising storing an association between the allocated internal band of media and the DPB by storing an association between LBAs of the allocated internal band of media to virtual LBAs of the DPB.

5. The method of claim 1, wherein allocating the internal band of media of the SSD to the new DPB comprises allocating one or more erasable units of NAND media within the SSD to the new DPB.

6. The method of claim 5, wherein each of the one or more erasable units is an erase block.

7. The method of claim 6, wherein:
    the DPB size is 1 gigabyte and a size of the erase block is 64 megabytes; and
    allocating one or more erasable units of NAND media within the SSD to the new DPB comprises allocating 16 erase blocks to the new DPB.

8. The method of claim 1, wherein the write command is a nonvolatile memory express (NVMe) write command.

9. A solid state drive (SSD) comprising:
    SSD memory; and
    an SSD controller configured to:
        determine a data placement block (DPB) size;
        receive a write command specifying a virtual logical block address (LBA);
        identify a DPB based on the virtual LBA of the write command;
        determine whether the identified DPB is a new DPB or an open DPB;
        in response to the determination that the identified DPB is a new DPB, open the DPB by allocating an internal band of media of the SSD memory for the new DPB by:
            allocating one or more erasable units of memory of the SSD memory to the new DPB; and
            allocating an additional erasable unit of memory of the SSD memory for defect management of the new DPB when XOR is enabled,
        wherein the allocated internal band of media comprises the one or more erasable units of memory of the SSD memory;
        cause data associated with the write command to be written to the one or more erasable units of memory of the SSD memory; and
        cause to be stored an association between the one or more erasable units of memory of the SSD memory and the virtual LBA of the write command.

10. The SSD of claim 9, wherein the SSD controller is configured to identify the DPB by virtualizing capacity of the SSD memory as a linear array of DPBs, each being of the DPB size, wherein each DPB of the linear array of DPBs is associated with a plurality of sequential virtual LBAs, and wherein a first DPB of the linear array of DPBs is aligned on LBA zero.

11. The SSD of claim 10, wherein the SSD controller is further configured to store an association between LBAs of the allocated internal band of media to virtual LBAs of the DPB.

12. The SSD of claim 9, wherein each of the one or more erasable units is an erase block.

13. The SSD of claim 9, wherein the write command is a nonvolatile memory express (NVMe) write command.

14. A method of a host sending data to a solid state drive (SSD) configured to determine whether a data placement block (DPB) is a new DPB or an open DPB, and in response to the determination that the DPB is a new DPB, open the DPB by allocating an internal band of media of the SSD for the new DPB by: allocating one or more erasable units of memory of the SSD to the new DPB and allocating an additional erasable unit of memory of the SSD for defect management of the new DPB when XOR is enabled, wherein the allocated internal band of media comprises the one or more erasable units of memory of the SSD, the method comprising:
    sending, by a host controller of the host, to the SSD, a data placement block (DPB) size;
    virtualizing, by the host controller, capacity of the SSD as a linear array of DPBs aligned on DPB-sized virtual logical block address (LBA) boundaries, wherein each one of the linear array of DPBs contains sequential virtual LBAs;

shaping, by the host controller, data into a DPB; and sending, by the host controller, to the SSD, the shaped data via a plurality of write commands specifying virtual LBAs of the DPB.

15. The method of claim 14, wherein shaping data into the DPB comprises shaping data in accordance with a redundant array of independent disks (RAID) format.

16. The method of claim 14, wherein the plurality of write commands are nonvolatile memory express (NVMe) write commands.

17. The method of claim 1, wherein allocating the additional erasable unit of memory of the SSD for defect management of the new DPB when XOR is enabled comprises causing to implement XOR internally across the internal band of media.

18. The SSD of claim 9, wherein allocating the additional erasable unit of memory of the SSD memory for defect management of the new DPB when XOR is enabled comprises causing to implement XOR internally across the internal band of media.

* * * * *